United States Patent
Kang et al.

(10) Patent No.: US 12,284,141 B2
(45) Date of Patent: Apr. 22, 2025

(54) COORDINATION OF DUPLEX DIRECTIONS IN NR TDD SYSTEM

(71) Applicant: Telefonaktiebolaget LM Ericsson (publ), Stockholm (SE)

(72) Inventors: Du Ho Kang, Sollentuna (SE); Jung-Fu Cheng, Fremont, CA (US); Havish Koorapaty, Saratoga, CA (US); Sorour Falahati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

(21) Appl. No.: 17/943,949

(22) Filed: Sep. 13, 2022

(65) Prior Publication Data

US 2023/0038315 A1 Feb. 9, 2023

Related U.S. Application Data

(63) Continuation of application No. 16/476,855, filed as application No. PCT/IB2018/050135 on Jan. 9, 2018, now Pat. No. 11,444,745.

(Continued)

(51) Int. Cl.
*H04L 5/14* (2006.01)
*H04L 5/16* (2006.01)
(Continued)

(52) U.S. Cl.
CPC .............. *H04L 5/1469* (2013.01); *H04L 5/16* (2013.01); *H04W 24/02* (2013.01); *H04W 28/18* (2013.01);
(Continued)

(58) Field of Classification Search
CPC ........ H04L 5/1469; H04L 5/16; H04W 24/02; H04W 28/18; H04W 72/0446; H04W 72/29

See application file for complete search history.

(56) References Cited

U.S. PATENT DOCUMENTS

| | | | |
|---|---|---|---|
| 2014/0029484 A1* | 1/2014 | Choi | H04L 5/1469 370/280 |
| 2014/0293843 A1 | 10/2014 | Papasakellariou et al. | |

(Continued)

FOREIGN PATENT DOCUMENTS

| | | |
|---|---|---|
| CN | 102215534 A | 10/2011 |
| CN | 104038943 A | 9/2014 |

(Continued)

OTHER PUBLICATIONS

Ericsson. "On the Design of Dynamic TDD", 3GPP TSG RAN WG1 #87, R1-1612773, Reno, USA, Nov. 5, 2016.

*Primary Examiner* — Charles C Jiang
*Assistant Examiner* — Shawn D Miller

(57) ABSTRACT

A method performed in a system comprising a joint traffic direction scheduler configured to coordinate time-division-duplexing (TDD) transmissions for multiple cells comprises obtaining TDD operation information from each of the cells, determining, based on the obtained TDD operation information, a transmission direction to be used by each of the cells during one or more transmission time intervals (TTIs), and indicating to the cells the determined transmission direction.

18 Claims, 7 Drawing Sheets

Related U.S. Application Data

(60) Provisional application No. 62/444,271, filed on Jan. 9, 2017.

(51) Int. Cl.
*H04W 24/02* (2009.01)
*H04W 28/18* (2009.01)
*H04W 72/0446* (2023.01)
*H04W 72/29* (2023.01)

(52) U.S. Cl.
CPC ....... *H04W 72/0446* (2013.01); *H04W 72/29* (2023.01)

(56) References Cited

U.S. PATENT DOCUMENTS

| | | | |
|---|---|---|---|
| 2015/0043390 A1 | 2/2015 | Wang et al. | |
| 2015/0156006 A1* | 6/2015 | Takano | H04W 72/30 370/280 |
| 2015/0215928 A1* | 7/2015 | Davydov | H04B 7/065 370/329 |
| 2015/0334704 A1 | 11/2015 | Wei et al. | |
| 2015/0373550 A1 | 12/2015 | Hong et al. | |
| 2016/0056907 A1 | 2/2016 | Wei et al. | |
| 2017/0041119 A1 | 2/2017 | Ang et al. | |
| 2017/0111160 A1* | 4/2017 | Chen | H04L 5/0053 |
| 2017/0134149 A1 | 5/2017 | Chini et al. | |
| 2019/0223181 A1* | 7/2019 | Sun | H04W 72/0446 |

FOREIGN PATENT DOCUMENTS

| | | |
|---|---|---|
| CN | 104170304 A | 11/2014 |
| CN | 104584658 A | 4/2015 |
| CN | 104854811 A | 8/2015 |
| CN | 105165084 A | 12/2015 |
| JP | 2014175800 A | 9/2014 |
| JP | 2016181900 A | 10/2016 |
| WO | 2015027389 A1 | 3/2015 |

\* cited by examiner

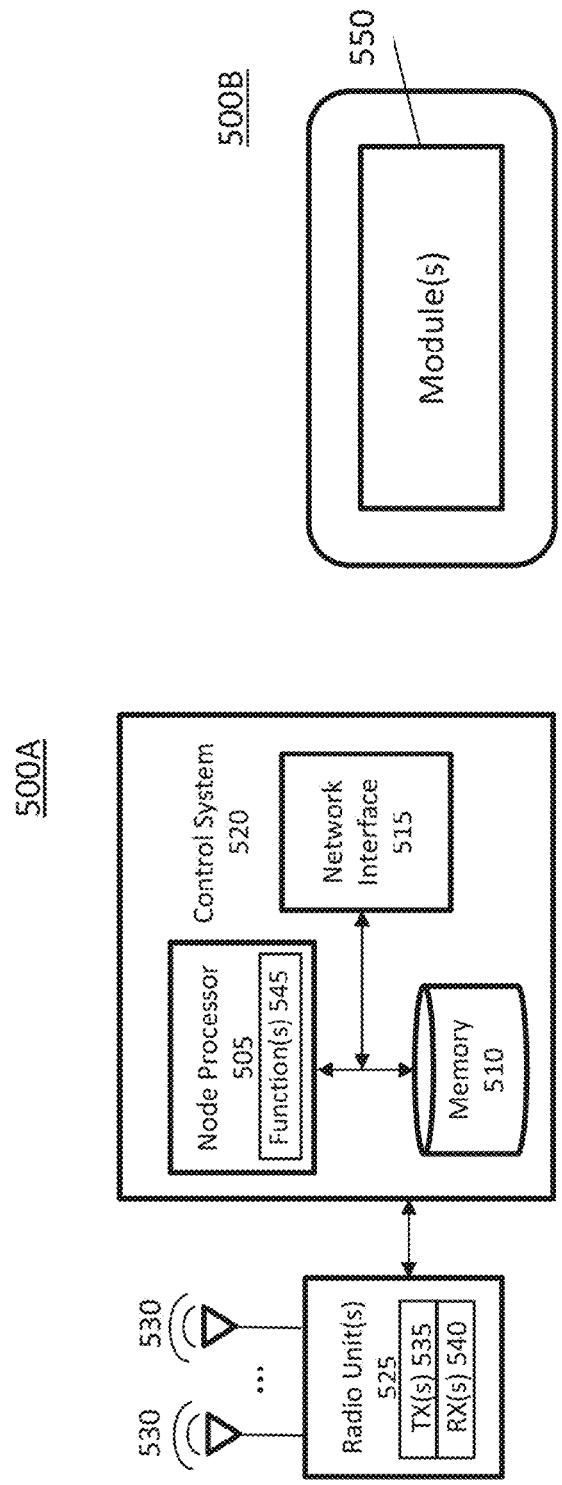

COORDINATION OF DUPLEX DIRECTIONS IN NR TDD SYSTEM

CROSS-REFERENCE TO RELATED APPLICATIONS

This application is a continuation of U.S. application Ser. No. 16/476,855, filed Jul. 9, 2019, granted as U.S. Pat. No. 11,444,745 on Sep. 13, 2022, which claims priority to U.S. Provisional Patent Application No. 62/444,271 filed on Jan. 9, 2017, the subject matter of which are hereby incorporated by reference.

TECHNICAL FIELD

The disclosed subject matter relates generally to telecommunications. Certain embodiments relate more particularly to coordination of duplex directions in a New Radio (NR) time-division-duplex (TDD) system.

BACKGROUND

In the third generation partnership project (3GPP), there is an ongoing Study Item that investigates a new radio interface for fifth generation telecommunications systems (5G). Terms for denoting this new and next generation technology have not yet converged, so the terms NR and 5G may be used interchangeably. Moreover, a base-station can be referred to as a gNB instead of an eNB. Alternatively, the term Transmission-Receive-point (TRP) can also be used. Also, the term Access point (AP) may be used instead of TRP/eNB/gNB.

Traditional LTE technology only supports static or semi-static TDD where time domain resources are split between downlink and uplink based on a long-term configuration or only once every "N" subframes. This will be very inefficient particularly when only one traffic direction exists since the other dedicated time resource for the other direction is wasted. NR may define dynamic time division duplexing (TDD) in order to maximally utilize given radio resources in the most efficient way for both traffic directions.

SUMMARY

In certain embodiments of the disclosed subject matter, coordination is achieved between different cells including co-located cells to avoid cross-link interference. Certain embodiments include an adaptive mode switch between static and dynamic TDD based on explicit signaling and information exchange between co-located cells, e.g., sector cells in the same Macro site, to handle very strong cross-link interference coming from co-located cells. Certain embodiments also include techniques for fast coordination between co-located or non-co-located cells.

Certain embodiments of the disclosed subject matter are presented in recognition of shortcomings associated with conventional techniques and technologies, such as the following examples. Although dynamic TDD brings significant performance gain at a low to medium load range, performance benefits become smaller as the traffic load increases due to the cross-link interference. In particular, if the cross-link interference comes from co-located cells, its impact on performance is very severe. For example, in FIG. 1, at a second slot, if Macro cell 1 is in uplink and will experience very strong interference from Macro cell 2 and 3 in downlink since all Macro cells are co-located. This example problem is demonstrated by a system level evaluation shown in FIG. 2 where dynamic TDD performs much worse than static TDD in the mid to high load range.

Certain embodiments of the disclosed embodiments may provide potential benefits compared to conventional techniques and technologies, such as the following examples. In NR TDD operation, certain embodiments can reduce cross-link interference between non-co-located cells that can cause severe interference to each other or co-located cells by adaptively switching the TDD mode between dynamic one and static one so that it can avoid erroneous transmissions without wasting resources on the air interface. Also, in NR TDD operation, certain embodiments can significantly enhance downlink and uplink performance. Also, in NR operation, certain embodiments can ensure relatively fast coordination between cells.

In some embodiments of the disclosed subject matter, a method performed in a system comprising a joint traffic direction scheduler configured to coordinate time-division-duplexing (TDD) transmissions for multiple cells comprises obtaining TDD operation information from each of the cells, determining, based on the obtained TDD operation information, a transmission direction to be used by each of the cells during one or more transmission time intervals (TTIs), and indicating to the cells the determined transmission direction.

In certain related embodiments, indicating the determined transmission direction comprises signaling that one or more predetermined TDD modes is to be used or is not to be used by one or more of the multiple cells. The one or more predetermined TDD modes may indicate e.g. a predetermined ratio of downlink-to-uplink (DL:UL) transmissions to be used by the one or more of the multiple cells. The one or more predetermined TDD modes may include, for instance, fully dynamic TDD mode, or a hybrid dynamic TDD mode in which a scheduling restriction is imposed within a part of dynamic TDD duration. Additionally, the method may further comprise signaling a duration of the one or more predetermined TDD modes.

In certain related embodiments, indicating the determined transmission direction comprises signaling that a predetermined TDD mode is to start or stop. In some such embodiments, the method may further comprise configuring the predetermined TDD mode independent of the signaling that the predetermined TDD mode is to start or stop.

In certain related embodiments, indicating the determined transmission direction comprises transmitting a bitmap for a set of upcoming TTIs indicating a transmission direction to be used by each the cells for each TTI.

In certain related embodiments, the method further comprises one or more of the cells determining scheduling details for its own operation during the one or more TTIs, wherein the scheduling details include one or more user equipments (UEs) to be scheduled and a modulation and coding scheme to be used.

In certain related embodiments, determining the transmission direction to be used by each of the cells during the one or more TTIs comprises one or more of (a) detecting a buffer status change for one or more of the cells, (b) detecting a buffer status for one or more of the cells, (c) detecting a change of a ratio of downlink-to-uplink (DL:UL) traffic in one or more buffers, and detecting a change of a quality of service (QOS) type to be applied to traffic associated with one or more of the cells. In some such embodiments, determining the transmission direction comprises detecting the buffer status change, and detecting the buffer status change comprises receiving a periodic or event-based report, and determining whether one or more of the cells have upcoming traffic for both uplink (UL) and downlink (DL) directions. In certain alternative embodiments, determining the transmission direction comprises detecting the change of the ratio of downlink-to-uplink traffic, and the method further comprises switching one or more TDD modes in response to the ratio crossing a threshold.

In certain related embodiments, the method further comprises sending a first mode selection signal to the cells to trigger the use of a dynamic TDD mode when all of the cells are to transmit data in the same TDD traffic direction during the one or more TTIs, else sending a second mode selection signal to the cells to trigger the use of a static TDD mode when not all of the cells are to transmit data in the same TDD traffic direction during the one or more TTIs.

In certain related embodiments, the method further comprises one or more of the cells switching from a current time-division-duplex (TDD) mode to a new TDD mode based on the indication.

In certain related embodiments, the method further comprises controlling the multiple cells to switch between a dynamic time-division-duplexing (TDD) mode and a static TDD mode, comprising (a) determining a direction of traffic to be scheduled for each of the multiple cells during one or more TTIs, (b) in response to determining that the direction of the traffic is the same for each of the multiple cells during the one or more TTIs, controlling the multiple cells to operate according to a dynamic TDD mode, and (c) in response to determining that the direction of the traffic is not the same for each of the multiple cells during the one or more TTIs, controlling the multiple cells to operate according to a static TDD mode. In some such embodiments, the method further comprises configuring the static TDD mode for each of the multiple cells according to a fixed downlink-to-uplink (DL:UL) ratio. In some such embodiments the method still further comprises adjusting the DL:UL ratio according to long-term traffic characteristics of a wireless communication network. Additionally, in some such embodiments the multiple cells may be co-located.

BRIEF DESCRIPTION OF THE DRAWINGS

The drawings illustrate selected embodiments of the disclosed subject matter. In the drawings, like reference labels denote like features.

FIG. 5A illustrates a radio access node according to an embodiment of the disclosed subject matter.

FIG. 5B illustrates a radio access node according to another embodiment of the disclosed subject matter.

DETAILED DESCRIPTION

Figure 1:
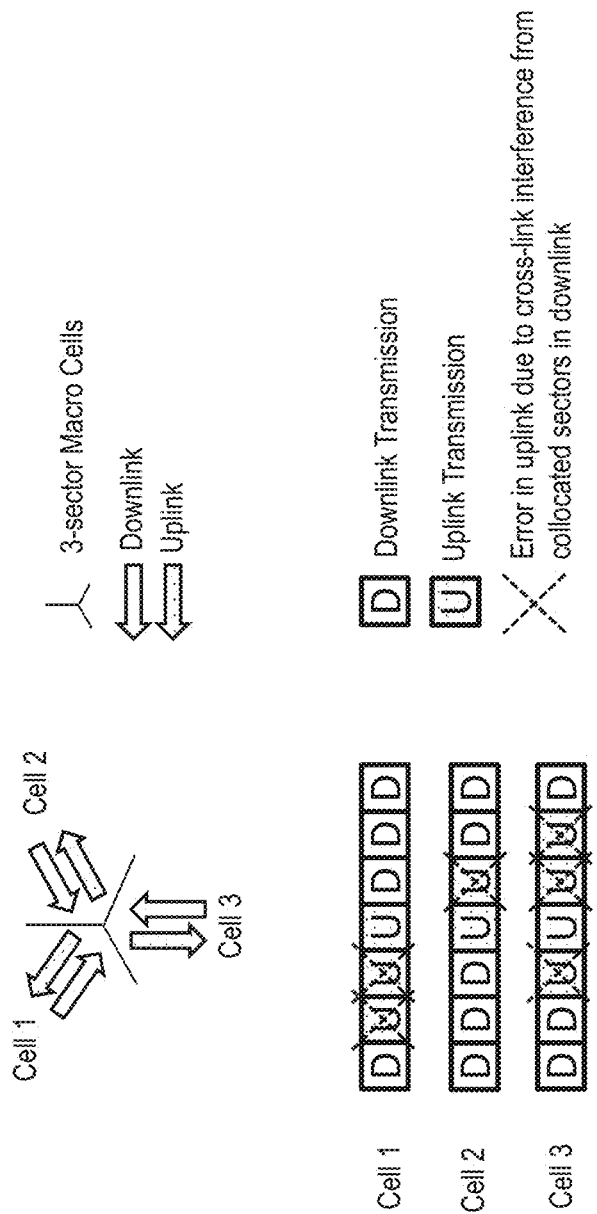
FIG. 1 illustrates a cross-link interference problem in a co-located Macro site.
Figure 2:
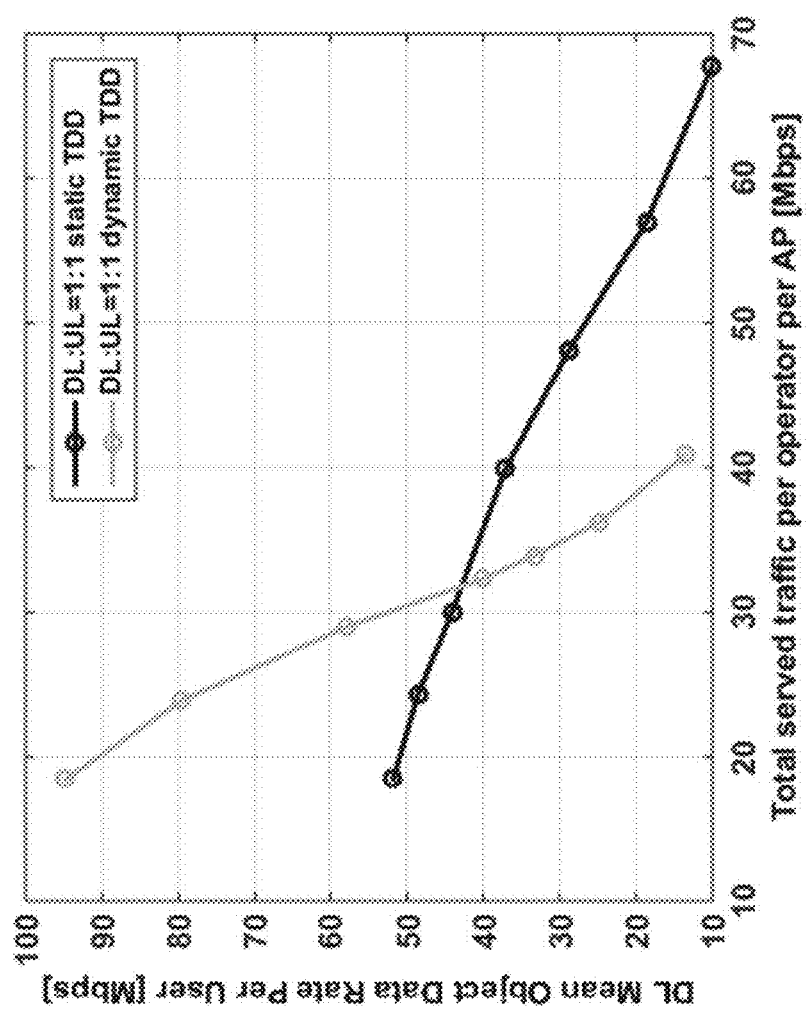
FIG. 2 illustrates performance loss of dynamic TDD at mid to high load due to intra-site cross-link interference (mean downlink data rate over served traffic in the scenario of 7 Macro sites with 3 sectors per site).

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In the description that follows, the terms User Equipment (UE), terminal, handset, etc. may be used interchangeably to denote a device that communicates with infrastructure. In general, these terms should not be construed to be limited to any specific type of device, and the described embodiments may be applicable to any device capable of implementing the described functions. The term base-station is intended to denote a node in the infrastructure that communicates with a UE.

Different names may be applicable, and the functionality of the base-station may also be distributed in various ways. For example, there could be a radio head terminating parts of the radio protocols and a centralized unit that terminates other parts of the radio protocols. We will not distinguish such implementations here, but rather the term base-station will refer to all alternative architectures for various embodiments.

Certain embodiments relate to dynamic TDD operation, in which time domain resources are dynamically allocated to DL or UL traffic. This may bring significant performance gain at a low to medium load compared to traditional static TDD in LTE, since dynamic TDD does not have any restriction on the usage of time domain resources in a certain period. U.S. Patent Application No. 62/421,740 considers fully distributed interference management without inter-cell signaling in order to employ dynamic mode switch between static TDD and dynamic TDD. Compared to that approach, certain embodiments as described herein consider coordination based explicit signaling between co-located cells at the same site, e.g., macro sector cells and also adds some additional embodiments for coordination between different cells that may not be co-located.

Certain embodiments as described herein provide intra-site cross-link interference management based on adaptive mode switch schemes between static TDD and dynamic TDD in order to manage cross-link interference among cells at the same site (e.g. in a multi-sector site corresponding to an eNB). Moreover, certain embodiments provide signaling type, timing, and triggering methods for TDD mode switch.

Embodiment 1: Centralized Adaptive TDD Mode Switch

A first embodiment provides a centralized TDD mode switch between dynamic TDD and predetermined static TDD. To coordinate a group of cells, a logical central entity can be introduced, which employs a joint traffic direction scheduler for all cells in the coordination group. The logical central entity can be, for instance, an additional inter-cell cell scheduling functionality on top of existing cell-level schedulers. It can be implemented, for instance, in a baseband processor covering multiple remote radio units.

Transceivers for the group of cells may be located at the same site. This joint direction scheduler gathers information from each cell and indicates the transmit direction to be used at all cells in the group for transmission time intervals (TTIs) during a certain period. The indication of the transmit directions for the TTIs could be made by indicating a TDD mode.

Based on the indicated transmit directions, each cell determines other scheduling details for each TTI including the UEs to be scheduled, the modulation and coding schemes to be used etc. Different types of indication signal for the transmit directions can be considered. As one example, 'need' or 'no need' of one predetermined TDD mode can be signaled to relevant cells. When a particular TDD mode is needed, this signal can further specify which one of predetermined TDD modes is needed. Once this signal is received by each cell, each cell switches to the indicated mode. A different predetermined mode can be e.g.:

Different DL and UL ratio of configurations for static TDD

Fully dynamic TDD without any scheduling restriction

Hybrid dynamic TDD with a scheduling restriction. The scheduling restriction can include a static TDD in a certain part of whole dynamic TDD duration. This scheme can be useful for reserving resource to protect QoS service types such as voice of video or critical control signaling during dynamic TDD mode.

Rather than signaling the selected mode, one way to reduce signaling overhead can be sending only 'start' and 'stop' signaling of one predetermined TDD mode. The predetermined TDD mode can be updated separately from the 'start' and 'stop' signaling.

This indication signal can also include the duration of one selected TDD mode. For example, the signal can include a start subframe index "N" and duration "Delta" which indicate starting and end timing of one TDD mode. Outside of the indicated duration, the other alternative mode can be used.

When a particular TDD mode is not needed, the signaling from the joint direction scheduler could include a bitmap for a set of upcoming TTIs indicating the transmission direction to be used for each TTI. For instance, a 0 in the bit corresponding to a TTI may indicate that this TTI is to be used for downlink traffic while a 1 in the bit may indicate that the TTI should be used for uplink traffic. In a further embodiment, a tri-valued signaling may be adopted: a 0 in the signal corresponding to a TTI may indicate that this TTI is to be used for downlink traffic, a 1 in the signal may indicate that the TTI should be used for uplink traffic, and a 2 in the signal may indicate that the TTI can be freely assigned to downlink or uplink traffic by the individual serving cells.

Embodiment 2: Triggers for Adaptation of Transmit Directions

This embodiment provides triggering mechanisms for switching or turning on/off TDD modes for the cells in the coordination group. As a non-limiting example, this can be done based on buffer status change in any of cells in the group. The buffer status in each cell can be periodically or event-based reported to the central entity. For example, if any neighboring cells in the coordination group have traffic in both DL and UL direction or any neighboring cells have traffic in different direction from what has been scheduled in the recent past, the central entity sends the mode selection signal to all cells in order to ensure the use of a predetermined static TDD mode which avoids intra-site cross-link interference. Otherwise when all neighboring cells have data only in the same traffic direction, it may send another signal to turn off a static TDD mode in order not to waste unused resource in one scheduling direction.

Another variant of this embodiment is also considering the ratio between DL and UL buffer size in one cell rather than considering only the presence of traffic in order to tradeoff DL and UL performance across co-located cells. For instance, if any one of co-located cells have non-zero buffer in both direction, the mode switch is triggered only when the traffic ratio is above a certain threshold and the number of macro cells exceeding that threshold is larger than N (<=total number of macro cells in the given coordination group). This triggering rule can be used to tradeoff DL and UL performance.

If the multi-directional traffic in the buffer is not large enough or is not present at many cells in the coordination group, the joint direction scheduler may use a bitmap as indicated in the previous embodiment for some number of upcoming subframes to specify transmit direction. The duration of this bitmap is also signaled.

As a non-limiting example, the mode switch can be also triggered based on the changes in the type of QoS services or change of ratio between buffer size of different types of traffic in order to further optimize TDD mode selection by considering QoS. If there is more high QoS traffic in one cell, the central entity may ensure static TDD mode more conservatively although it causes waste of air resource in other co-located cells without QoS traffic.

Embodiment 3: Timing Aspects of Transmit Direction Signaling

Another embodiment provides timing aspects for the signaling of transmit directions. The signaling can be in either a very fast time scale, e.g., TTI level, which is doable if all cells are physically connected nearby with dedicated backhauls, or in relatively long term time scale such as file arrival. This different time scale can be applied for both triggering information update to the central entity and the transmission direction signaling from the central entity. In other words, triggering information can be more frequently updated to central entity but transmission direction signaling, e.g., in the form of TDD modes to use, can be done on a slower time scale.

In one variation of this embodiment, when a TDD mode is signaled, the TTI boundaries to which the DL:UL ratio is aligned is also either explicitly or implicitly signaled. Hence, consider that a TDD mode operates with 4 DL TTIs and one UL TTI. Then, the central entity may either explicitly or implicitly signal that the 4:1 DL:UL ratio is aligned to start at TTIs $\{0, 5, \ldots \}$. The alignment information may also be part of the TDD mode definition.

In another variation of this embodiment, when the use of a TDD mode is signaled, the TDD mode may be applied instantly to the very next TTI assuming that the TDD mode is already under use. To illustrate this, in the above example of a DL:UL ratio of 4:1, if the central entity signals the use of a 4:1 TDD mode and this signaling is received in TTI 2, the cell only DL transmissions in TTI 3 even if there is some UL traffic to be scheduled and waits until TTI 4 for the transmission of UL traffic since this is consistent with a 4:1 TDD mode if it had started at TTI 0.

Embodiment 4: Distributed Coordination

The TDD mode switch can be done without explicit command from the central entity as long as relevant triggering information is exchanged among cells instead of being reported to the central entity. This solution can avoid TDD mode switch signaling overhead since all scheduling decision will be done based on exchanged triggering information which will be common for all relevant cells in the same coordination group. When distributed coordination is used, explicit TTI indices may be used as part of the signaling to indicate transmit directions to accommodate different signaling delays between the different nodes.

The described embodiments may be implemented in any appropriate type of communication system supporting any suitable communication standards and using any suitable components. As one example, certain embodiments may be implemented in a communication system such as that illustrated in FIG. 3. Although certain embodiments are described with respect to 3GPP systems and related terminology, the disclosed concepts are not limited to LTE or a 3GPP system. Additionally, although reference may be made to the term "cell", the described concepts may also apply in other contexts, such as beams used in 5G, for instance.

Figure 3:
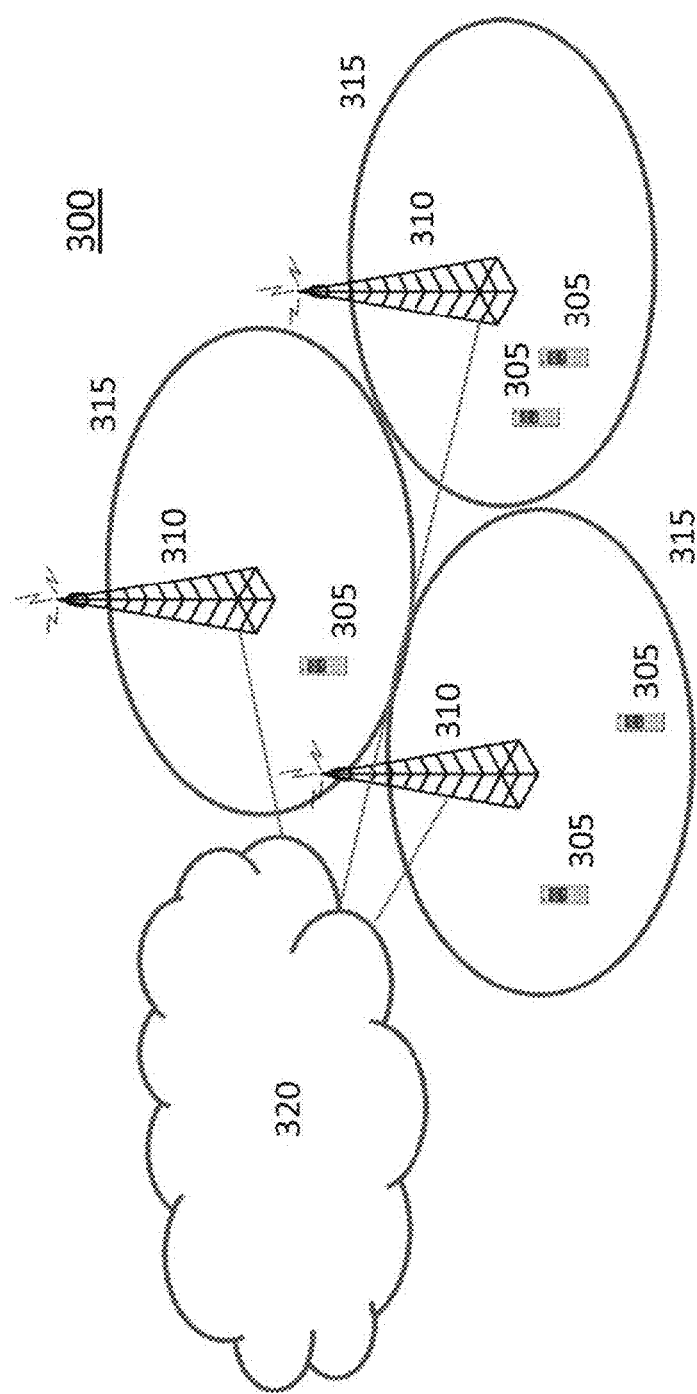
FIG. 3 illustrates a communication system according to an embodiment of the disclosed subject matter.

Referring to FIG. 3, a communication system 300 comprises a plurality of wireless communication devices 305 (e.g., UEs, machine type communication [MTC]/machine-to-machine [M2M] UEs) and a plurality of radio access nodes 310 (e.g., eNodeBs or other base stations). Communication system 100 is organized into cells 315, which are connected to a core network 320 via corresponding radio access nodes 310. Radio access nodes 310 are capable of communicating with wireless communication devices 305 along with any additional elements suitable to support communication between wireless communication devices or between a wireless communication device and another communication device (such as a landline telephone).

Figure 4B:
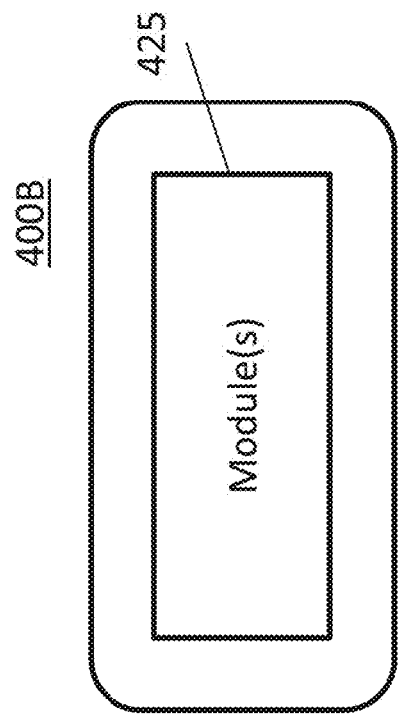
FIG. 4B illustrates a wireless communication device according to another embodiment of the disclosed subject matter.
Figure 4A:
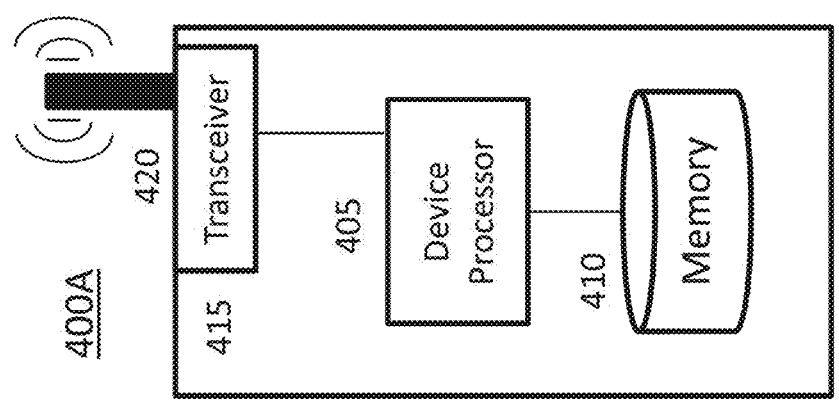
FIG. 4A illustrates a wireless communication device according to an embodiment of the disclosed subject matter.

Although wireless communication devices 305 may represent communication devices that include any suitable combination of hardware and/or software, these wireless communication devices may, in certain embodiments, represent devices such as those illustrated in greater detail by FIGS. 4A and 4B. Similarly, although the illustrated radio access node may represent network nodes that include any suitable combination of hardware and/or software, these nodes may, in particular embodiments, represent devices such those illustrated in greater detail by FIGS. 5A, 5B and 6.

Referring to FIG. 4A, a wireless communication device 400A comprises a processor 405 (e.g., Central Processing Units [CPUs], Application Specific Integrated Circuits [ASICs]. Field Programmable Gate Arrays [FPGAs], and/or the like), a memory 410, a transceiver 415, and an antenna 420. In certain embodiments, some or all of the functionality described as being provided by UEs, MTC or M2M devices, and/or any other types of wireless communication devices may be provided by the device processor executing instructions stored on a computer-readable medium, such as memory 410. Alternative embodiments may include additional components beyond those shown in FIG. 4A that may be responsible for providing certain aspects of the device's functionality, including any of the functionality described herein.

Referring to FIG. 4B, a wireless communication device 400B comprises at least one module 425 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 4A.

Referring to FIG. 5A, a radio access node 500A comprises a control system 520 that comprises a node processor 505 (e.g., Central Processing Units (CPUs), Application Specific Integrated Circuits (ASICs), Field Programmable Gate Arrays (FPGAs), and/or the like), memory 510, and a network interface 515. In addition, radio access node 500A comprises at least one radio unit 525 comprising at least one transmitter 535 and at least one receiver coupled to at least one antenna 530. In some embodiments, radio unit 525 is external to control system 520 and connected to control system 520 via, e.g., a wired connection (e.g., an optical cable). However, in some other embodiments, radio unit 525 and potentially the antenna 530 are integrated together with control system 520. Node processor 505 operates to provide at least one function 545 of radio access node 500A as described herein. In some embodiments, the function(s) are implemented in software that is stored, e.g., in the memory 510 and executed by node processor 505.

In certain embodiments, some or all of the functionality described as being provided by a base station, a node B, an enodeB, and/or any other type of network node may be provided by node processor 505 executing instructions stored on a computer-readable medium, such as memory 510 shown in FIG. 5A. Alternative embodiments of radio access node 500 may comprise additional components to provide additional functionality, such as the functionality described herein and/or related supporting functionality.

Referring to FIG. 5B, a radio access node 500B comprises at least one module 550 configured to perform one or more corresponding functions. Examples of such functions include various method steps or combinations of method steps as described herein with reference to radio access node(s). In general, a module may comprise any suitable combination of software and/or hardware configured to perform the corresponding function.

For instance, in some embodiments a module comprises software configured to perform a corresponding function when executed on an associated platform, such as that illustrated in FIG. 5A.

Figure 6:
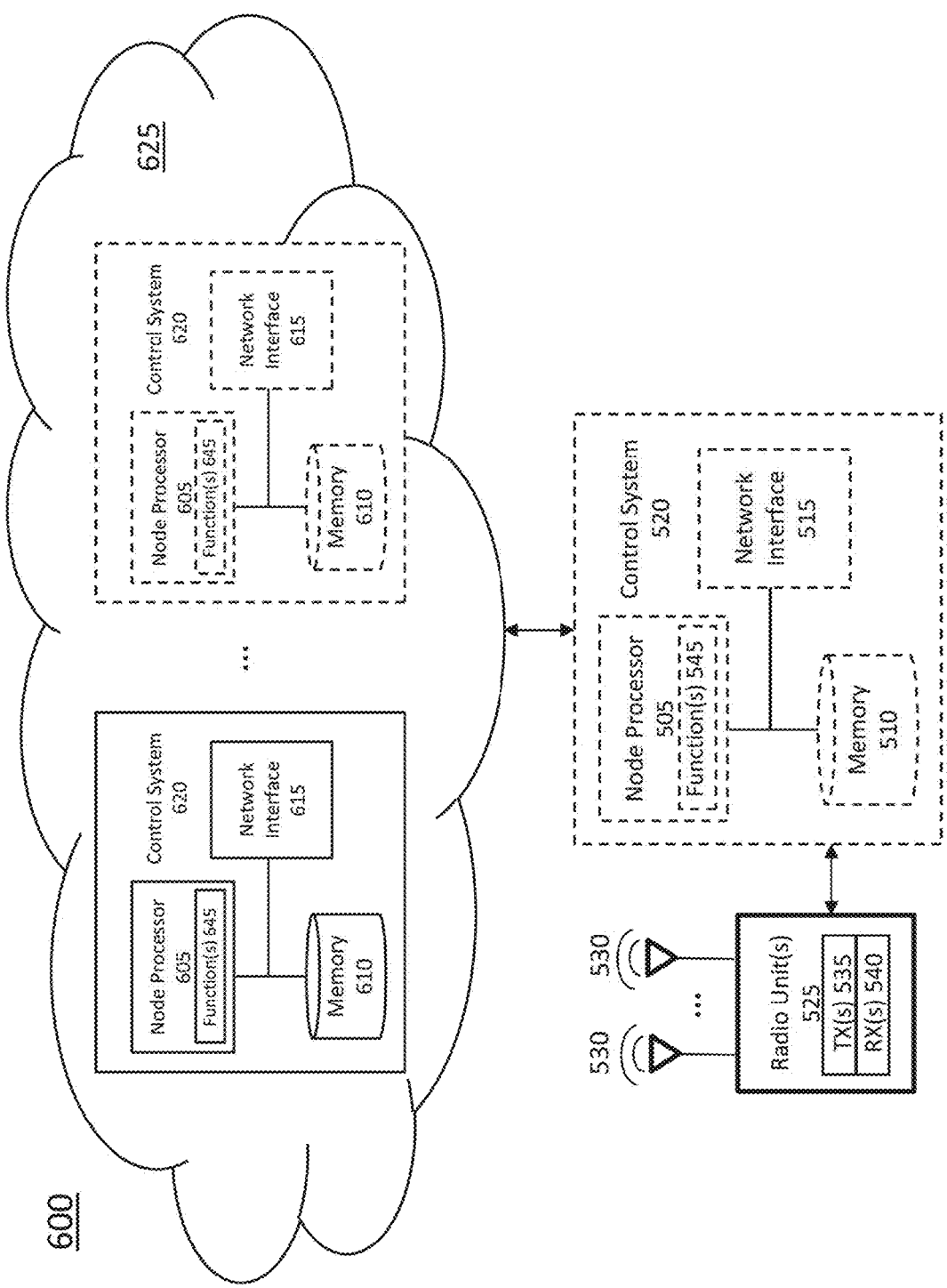
FIG. 6 illustrates a radio access node according to yet another embodiment of the disclosed subject matter.

FIG. 6 is a block diagram that illustrates a virtualized radio access node 600 according to an embodiment of the disclosed subject matter. The concepts described in relation to FIG. 6 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 6, radio access node 600 comprises control system 520 as described in relation to FIG. 5A.

Control system 520 is connected to one or more processing nodes 620 coupled to or included as part of a network(s) 625 via network interface 515. Each processing node 620 comprises one or more processors 605 (e.g., CPUs, ASICs, FPGAs, and/or the like), memory 610, and a network interface 615.

In this example, functions 545 of radio access node 500A described herein are implemented at the one or more processing nodes 620 or distributed across control system 520 and the one or more processing nodes 620 in any desired manner. In some embodiments, some or all of the functions 545 of radio access node 500A described herein are implemented as virtual components executed by one or more virtual machines implemented in a virtual environment(s) hosted by processing node(s) 620. As will be appreciated by one of ordinary skill in the art, additional signaling or communication between processing node(s) 620 and control system 320 is used in order to carry out at least some of the desired functions 545. As indicated by dotted lines, in some embodiments control system 520 may be omitted, in which case the radio unit(s) 525 communicate directly with the processing node(s) 620 via an appropriate network interface (s).

In some embodiments, a computer program comprises instructions which, when executed by at least one processor, causes at least one processor to carry out the functionality of a radio access node (e.g., radio access node 310 or 500A) or another node (e.g., processing node 620) implementing one or more of the functions of the radio access node in a virtual environment according to any of the embodiments described herein.

Figure 7:
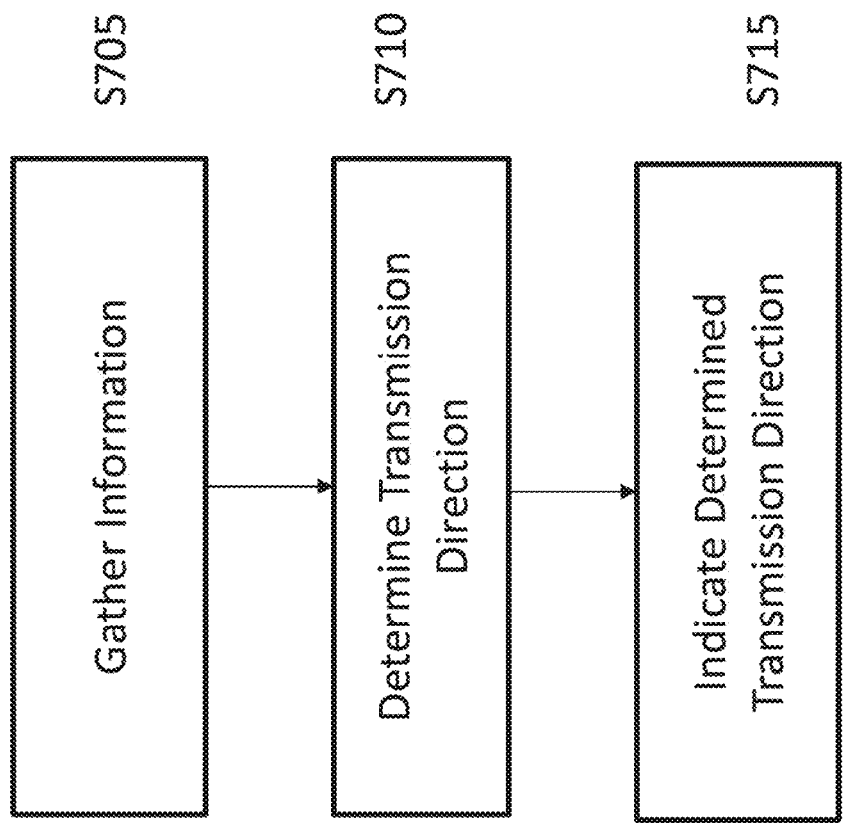
FIG. 7 illustrates a method according to an embodiment of the disclosed subject matter.

FIG. 7 is a flowchart illustrating a method according to an embodiment of the disclosed subject matter. The method may be performed by e.g. an apparatus comprising processing circuitry, memory and at least one transceiver configured to perform relevant operations. The method is typically performed in a system comprising a joint traffic direction scheduler for multiple cells (e.g. a coordination group), and such a system may take any of various alternative forms, such as the network illustrated in FIG. 3, for example. Within such a system, particular steps of the method may be implemented in any suitable apparatus such as any of those illustrated in FIGS. 3-6, for instance.

Referring to FIG. 7, the method comprises gathering (or collecting, identifying, obtaining, etc.) information for each cell (S705), determining, based on the gathered information, a transmission direction to be used by the cells during at least one transmission time interval (TTI) (S710), and indicating to the cells the determined transmission direction (S715). The gathered information typically comprises TDD operation information, which is information associated with TDD operation by a wireless communication device or a radio access node.

In certain related embodiments, indicating the determined transmission direction comprises signaling that one or more predetermined TDD modes is to be used or is not to be used by one or more of the multiple cells. The one or more predetermined TDD modes may indicate e.g. a predetermined ratio of downlink-to-uplink (DL:UL) transmissions to be used by the one or more of the multiple cells. The one or more predetermined TDD modes may include, for instance, fully dynamic TDD mode, or a hybrid dynamic TDD mode in which a scheduling restriction is imposed within a part of dynamic TDD duration. Additionally, the method may further comprise signaling a duration of the one or more predetermined TDD modes.

In certain related embodiments, indicating the determined transmission direction comprises signaling that a predetermined TDD mode is to start or stop. In some such embodiments, the method may further comprise configuring the predetermined TDD mode independent of the signaling that the predetermined TDD mode is to start or stop.

In certain related embodiments, indicating the determined transmission direction comprises transmitting a bitmap for a set of upcoming TTIs indicating a transmission direction to be used by each the cells for each TTI.

In certain related embodiments, the method further comprises one or more of the cells determining scheduling details for its own operation during the one or more TTIs, wherein the scheduling details include one or more user equipments (UEs) to be scheduled and a modulation and coding scheme to be used.

In certain related embodiments, determining the transmission direction to be used by each of the cells during the one or more TTIs comprises one or more of (a) detecting a buffer status change for one or more of the cells, (b) detecting a buffer status for one or more of the cells, (c) detecting a change of a ratio of downlink-to-uplink (DL:UL) traffic in one or more buffers, and detecting a change of a quality of service (QOS) type to be applied to traffic associated with one or more of the cells. In some such embodiments, determining the transmission direction comprises detecting the buffer status change, and detecting the buffer status change comprises receiving a periodic or event-based report, and determining whether one or more of the cells have upcoming traffic for both uplink (UL) and downlink (DL) directions. In certain alternative embodiments, determining the transmission direction comprises detecting the change of the ratio of downlink-to-uplink traffic, and the method further comprises switching one or more TDD modes in response to the ratio crossing a threshold.

In certain related embodiments, the method further comprises sending a first mode selection signal to the cells to trigger the use of a dynamic TDD mode when all of the cells are to transmit data in the same TDD traffic direction during the one or more TTIs, else sending a second mode selection signal to the cells to trigger the use of a static TDD mode when not all of the cells are to transmit data in the same TDD traffic direction during the one or more TTIs.

In certain related embodiments, the method further comprises one or more of the cells switching from a current time-division-duplex (TDD) mode to a new TDD mode based on the indication.

In certain related embodiments, the method further comprises controlling the multiple cells to switch between a dynamic time-division-duplexing (TDD) mode and a static TDD mode, comprising (a) determining a direction of traffic to be scheduled for each of the multiple cells during one or more TTIs, (b) in response to determining that the direction of the traffic is the same for each of the multiple cells during the one or more TTIs, controlling the multiple cells to operate according to a dynamic TDD mode, and (c) in response to determining that the direction of the traffic is not the same for each of the multiple cells during the one or more TTIs, controlling the multiple cells to operate according to a static TDD mode. In some such embodiments, the method further comprises configuring the static TDD mode for each of the multiple cells according to a fixed downlink-to-uplink (DL:UL) ratio. In some such embodiments the method still further comprises adjusting the DL:UL ratio according to long-term traffic characteristics of a wireless communication network. Additionally, in some such embodiments the multiple cells may be co-located.

While the disclosed subject matter has been presented above with reference to various embodiments, it will be understood that various changes in form and details may be made to the described embodiments without departing from the overall scope of the disclosed subject matter.

The invention claimed is:

1. A method performed by a network node operating as a joint traffic direction scheduler of a coordination group including multiple cells, comprising:
   obtaining time-division duplexing (TDD) operation information from each cell included in the coordination group;
   determining, based on the obtained TDD operation information, a transmission direction to be used by each of the cells during one or more transmission time intervals (TTIs), wherein determining the transmission direction comprises detecting the change of the ratio of downlink-to-uplink traffic and switching one or more TDD modes in response to the ratio crossing a threshold; and indicating to the cells the determined transmission direction.

2. The method of claim 1, wherein indicating the determined transmission direction comprises signaling that one or more predetermined TDD modes is to be used or is not to be used by one or more of the multiple cells.

3. The method of claim 2, wherein the one or more predetermined TDD modes indicates a predetermined ratio of downlink-to-uplink (DL:UL) transmissions to be used by the one or more of the multiple cells.

4. The method of claim 2, wherein the one or more predetermined TDD modes comprises a fully dynamic TDD mode.

5. The method of claim 2, wherein the one or more predetermined TDD modes comprises a hybrid dynamic TDD mode in which a scheduling restriction is imposed within a part of dynamic TDD duration.

6. The method of claim 2, further comprising signaling a duration of the one or more predetermined TDD modes.

7. The method of claim 1, wherein determining the transmission direction to be used by each of the cells during the one or more TTIs comprises one or more of:
    detecting a buffer status change for one or more of the cells;
    detecting a buffer status for one or more of the cells;
    detecting a change of a ratio of downlink-to-uplink (DL:UL) traffic in one or more buffers; and
    detecting a change of a quality of service (QOS) type to be applied to traffic associated with one or more of the cells.

8. The method of claim 7, wherein determining the transmission direction comprises detecting the buffer status change, and detecting the buffer status change comprises:
    receiving a periodic or event-based report; and
    determining whether one or more of the cells have upcoming traffic for both uplink (UL) and downlink (DL) directions.

9. The method of claim 1, further comprising sending a first mode selection signal to the cells to trigger the use of a dynamic TDD mode when all of the cells are to transmit data in the same TDD traffic direction during the one or more TTIs, else sending a second mode selection signal to the cells to trigger the use of a static TDD mode when not all of the cells are to transmit data in the same TDD traffic direction during the one or more TTIs.

10. The method of claim 1, further comprising one or more of the cells switching from a current time-division-duplex (TDD) mode to a new TDD mode based on the indication.

11. A method performed by a network node operating as a joint traffic direction scheduler of a coordination group including multiple cells, comprising:
    obtaining time-division duplexing (TDD) operation information from each cell included in the coordination group;
    determining, based on the obtained TDD operation information, a transmission direction to be used by each of the cells during one or more transmission time intervals (TTIs);
    in response to determining that the direction of the traffic is the same for each of the multiple cells during the one or more TTIs, controlling the multiple cells to operate according to a dynamic TDD mode by indicating to the cells the determined transmission direction; and
    in response to determining that the direction of the traffic is not the same for each of the multiple cells during the one or more TTIs, controlling the multiple cells to operate according to a static TDD mode by indicating to the cells the determined transmission direction.

12. The method of claim 11, wherein the multiple cells are co-located.

13. A network node comprising a joint traffic direction scheduler configured to coordinate time-division-duplexing (TDD) transmissions for multiple cells, comprising:
    processing circuitry, memory, and at least one transceiver collectively configured to:
    obtain TDD operation information from each of the cells;
    determine, based on the obtained TDD operation information, a transmission direction to be used by each of the cells during one or more transmission time intervals (TTIs), wherein determining the transmission direction comprises detecting the change of the ratio of downlink-to-uplink traffic and switching one or more TDD modes in response to the ratio crossing a threshold; and
    indicate to the cells the determined transmission direction.

14. The network node of claim 13, wherein determining the transmission direction to be used by each of the cells during the one or more TTIs comprises one or more of:
    detecting a buffer status change for one or more of the cells;
    detecting a buffer status for one or more of the cells;
    detecting a change of a ratio of downlink-to-uplink (DL:UL) traffic in one or more buffers; and
    detecting a change of a quality of service (QOS) type to be applied to traffic associated with one or more of the cells.

15. The network node of claim 14, wherein determining the transmission direction comprises detecting the buffer status change, and detecting the buffer status change comprises:
    receiving a periodic or event-based report; and
    determining whether one or more of the cells have upcoming traffic for both uplink (UL) and downlink (DL) directions.

16. The network node of claim 13, wherein the processing circuitry, memory, and at least one transceiver are further collectively configured to send a first mode selection signal to the cells to trigger the use of a dynamic TDD mode when all of the cells are to transmit data in the same TDD traffic direction during the one or more TTIs, else send a second mode selection signal to the cells to trigger the use of a static TDD mode when not all of the cells are to transmit data in the same TDD traffic direction during the one or more TTIs.

17. The network node of claim 13, wherein the processing circuitry, memory, and at least one transceiver are further collectively configured to control the multiple cells to switch between a dynamic time-division-duplexing (TDD) mode and a static TDD mode, comprising:
    determining a direction of traffic to be scheduled for each of the multiple cells during one or more TTIs;
    in response to determining that the direction of the traffic is the same for each of the multiple cells during the one or more TTIs, controlling the multiple cells to operate according to a dynamic TDD mode; and
    in response to determining that the direction of the traffic is not the same for each of the multiple cells during the one or more TTIs, controlling the multiple cells to operate according to a static TDD mode.

18. The network node of claim 13, wherein the network node is a baseband processor covering a remote radio unit for each of the multiple cells.

* * * * *